United States Patent [19]

von Broock et al.

[11] Patent Number: 4,901,814

[45] Date of Patent: Feb. 20, 1990

[54] MOUNTING OF AN INTERNAL COMBUSTION ENGINE

[75] Inventors: Ulrich von Broock, Weissach; Ruediger Fischle, Leonberg; Rolf von Sivers, Rutesheim, all of Fed. Rep. of Germany

[73] Assignee: Porsche AG, Weissach, Fed. Rep. of Germany

[21] Appl. No.: 213,301

[22] Filed: Jun. 29, 1988

[30] Foreign Application Priority Data

Jun. 30, 1987 [DE] Fed. Rep. of Germany ....... 3721507

[51] Int. Cl.$^4$ .............................................. B60K 5/12
[52] U.S. Cl. ...................................... 180/297; 180/300
[58] Field of Search ................ 180/297, 300, 299, 292

[56] References Cited

U.S. PATENT DOCUMENTS

| | | | |
|---|---|---|---|
| 2,084,080 | 6/1937 | D'Aubargde | 180/300 |
| 2,106,541 | 1/1938 | Tjaarda | 180/292 |
| 3,402,782 | 9/1968 | Ljungstrom | 180/300 |
| 3,825,090 | 7/1974 | Runkle | 180/300 |
| 4,240,517 | 12/1980 | Harlow et al. | 180/297 |
| 4,440,257 | 4/1984 | Danckert | 180/297 |
| 4,667,764 | 5/1987 | Sawada et al. | 180/297 |

FOREIGN PATENT DOCUMENTS

| | | |
|---|---|---|
| 0108000 | 4/1986 | European Pat. Off. . |
| 3402100 | 8/1985 | Fed. Rep. of Germany . |
| 2453746 | 11/1980 | France . |
| 58-63520 | 4/1983 | Japan . |
| 0012418 | 1/1987 | Japan ................. 180/300 |

OTHER PUBLICATIONS

DE-Z- *Kraftfahrzeugtechnik*, 1981, vol. 7, pp. 204–206.

Primary Examiner—David M. Mitchell
Attorney, Agent, or Firm—Barnes & Thornburg

[57] ABSTRACT

A mounting of an internal combustion engine which has V-shaped cylinder rows and is installed transversely into the body of a passenger motor vehicle. The internal combustion engine is suspended at two bearing supports and is supported with respect to the body by means of two torque supports.

23 Claims, 3 Drawing Sheets

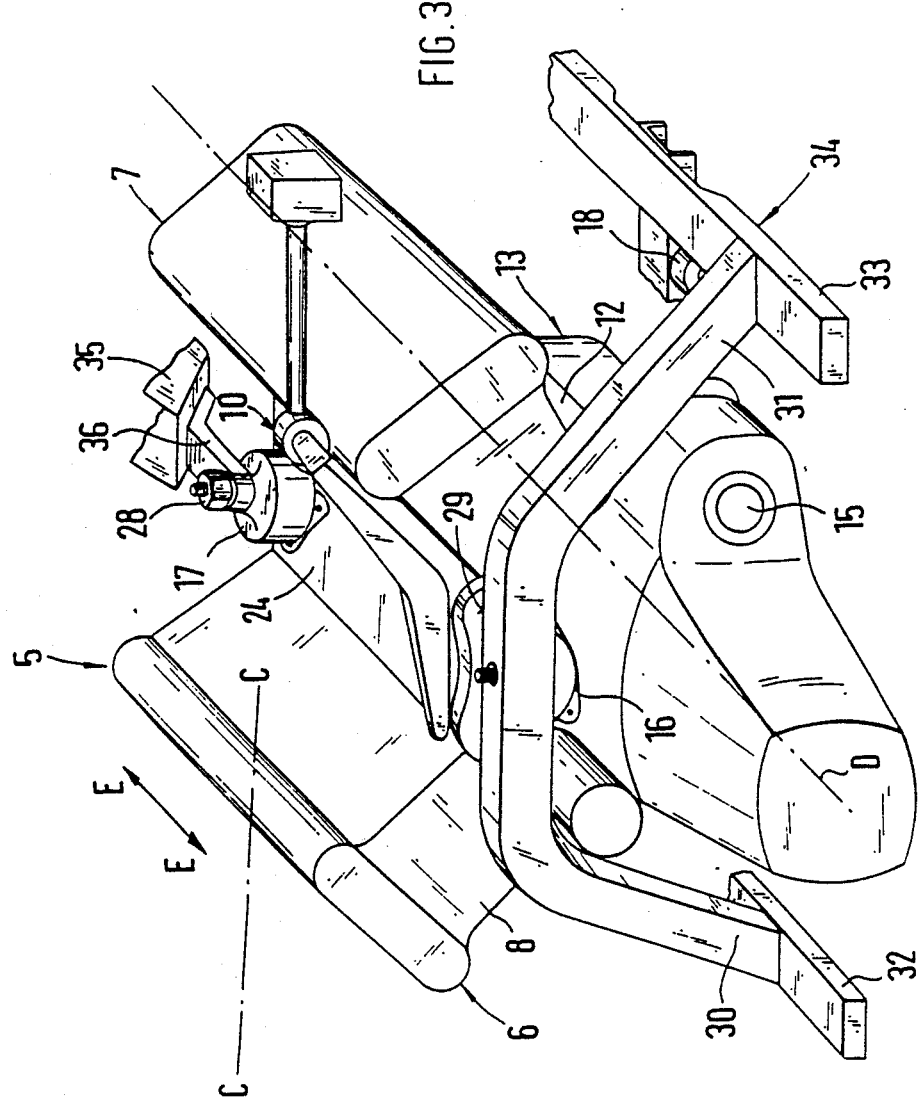

MOUNTING OF AN INTERNAL COMBUSTION ENGINE

BACKGROUND AND SUMMARY OF THE INVENTION

The present invention relates to a mounting of an internal combustion engine which includes preferably V-shaped cylinder rows, forms a unit with a transmission and is installed transversely into a body of a passenger motor vehicle.

The DE-AS 22 22 254 relates to a suspension arrangement for a motor vehicle-drive aggregate which is installed transversely in the front section of the motor vehicle. The suspension arrangement includes elastic bearing supports and torque supports that are arranged between fixed motor vehicle parts and the drive aggregate.

It is the object of the present invention to so construct a mounting for an internal combustion engine installed in a passenger motor vehicle that the occurring vibrations, noises and mass movements of the internal combustion engines are efficiently absorbed and considerably dampened, i.e., are introduced disturbance-free into the body of the passenger motor vehicle. However, the movement freedom of the internal combustion engine is thereby also to be properly taken into consideration.

The underlying problems are solved according to the present invention in that the internal combustion engine is suspended at least at a first bearing support and at a second bearing support in such a manner that the first bearing support is provided above but not far from the horizontal plane through the center of gravity as well as adjacent to the vertical plane through the center of gravity of the internal combustion engine and the second bearing support is provided on the side remote from the transmission, especially in proximity of the end wall of the internal combustion engine, whereby at least two horizontally directed torque braces or torque supports arranged offset in height to one another extend between an end wall of the body and the internal combustion engine.

The advantages achieved with the present invention reside principally in that owing to the arrangement and construction of the bearing supports as well as of the torque supports the excitations of the internal combustion engine are well-dampened during the driving operation and are introduced in a low-noise manner into the body of the passenger motor vehicle whereby the thus-constructed mounting assures a defined movability of the internal combustion engine. The two bearing supports absorb effectively static and dynamic weight forces. Additionally, they can be readily attached at the aggregate formed by the internal combustion engine and the transmission. Furthermore, the installation of the internal combustion engine is simple owing to the position of the bearing supports.

The torque supports are so attached that a deliberate relatively large distance base exists between the same. Therebeyond, these torque supports are located within an area of small aggregate vibrations which reduces the vibration introduction under load.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 3 is a perspective view, on an enlarged scale, of a detail X of FIG. 1.

DETAILED DESCRIPTION OF THE DRAWINGS

Figure 1:
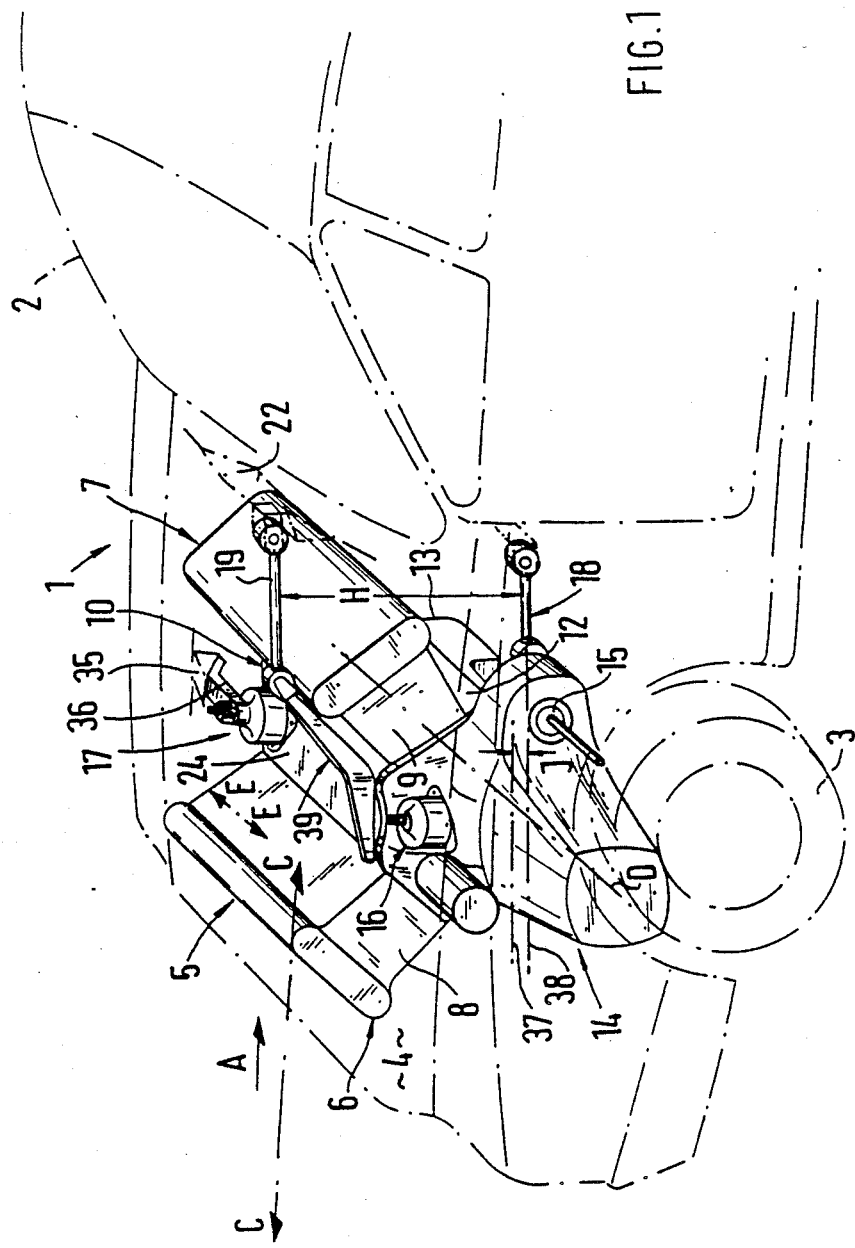
FIG. 1 is a perspective view of a passenger motor vehicle with a mounting of the internal combustion engine according to the present invention.

Referring now to the drawing wherein like reference numerals are used throughout the various views to designate like parts, the passenger motor vehicle generally designated by reference numeral 1 includes a body 2 which is carried by the wheels 3. The body 2 includes a front space 4 into which is installed an internal combustion engine 5. The internal combustion engine 5 is positioned transversely to the vehicle longitudinal direction C—C and includes V-shaped cylinder rows 6 and 7 that are arranged at an angle of 105° to one another. Three cylinders are provided per cylinder row whose Pistons are connected with a three-cranked crankshaft. The crankshaft is not shown.

Additionally, the internal combustion engine 5 includes two cylinder heads 8 and 9 which are connected to a crankcase 10. The crankcase 10 includes below the cylinder heads 8 and 9 vertically arranged lateral walls 11 and 12 which are connected with an oil pan 13.

Formed in one block wit the internal combustion engine 5 is a transmission 14 that forms an extension of the internal combustion engine 5, and is provided at 15 with a drive output for the wheel 3, i.e., the passenger motor vehicle 1 is driven at least by way of the front wheels 3.

Figure 2:
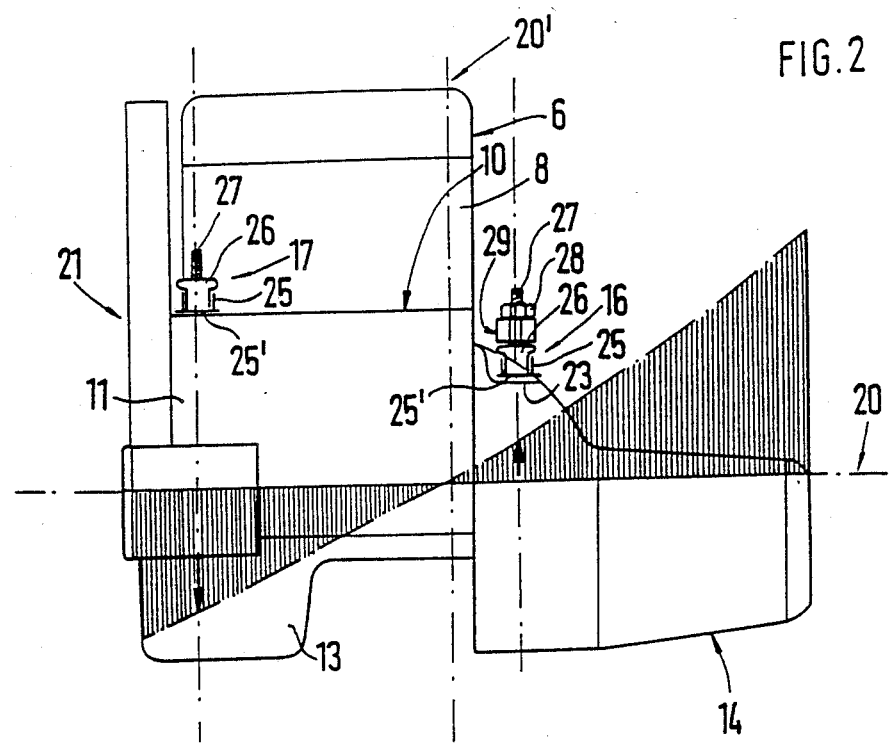
FIG. 2 is a view in the direction of arrow A of FIG. 1, on an enlarged scale.

A first bearing support 16, a second bearing support 17 and torque supports 18 and 19 serve for the mounting of the internal combustion engine 5. The internal combustion engine 5 is suspended underneath the elastically and possibly also hydraulically damped bearing supports 16 and 17. The first bearing support 16 is thereby arranged above but not far from the horizontal plane 20 through the center of gravity as well as in or adjacent the vertical plane 20' through the center of gravity of the internal combustion engine 5. The second bearing support 17, by contrast, is attached on the side remote from the transmission 14 near the free end face 21 of the internal combustion engine 5--FIG. 2.

The torque braces or supports 18 and 19 are directed horizontally, extend with a vertical spacing H to one another and are disposed between an end wall (firewall) 22 of the body 2 and the internal combustion engine 5, respectively, the transmission 14.

The first bearing support 16 cooperates with the transmission 14 which includes in the corresponding area a mounting 23 for the bearing support 16. The second bearing support 17 is connected to the internal combustion engine, and more particularly at the crankcase 9 between the cylinder rows 6 and 7. The crankcase 10 is provided thereat with a horizontal wall 24. Furthermore, both bearing supports 16 and 17 are disposed in proximity of an internal combustion engine center longitudinal plane which intersects the crankshaft longitudinal axis D.

Both bearing supports 16 and 17 are structurally identical parts with identical rubber geometry; however, they are arranged differently; the first bearing support 16 is stiffer in the vehicle longitudinal direction C—C than in the vehicle transverse direction E—E; it is the reverse in connection with the second bearing support 17.

The bearing supports 16 and 17 include mounting members 25 for elastic elements 26, whereby the mounting members 25 are provided with metallic flanges 25' (FIG. 2) which are connected directly with the crankcase 10, respectively, the transmission 14 by means of bolts. Threaded bolts 27 extend out of the elastic elements 26 which are retained at the body 2 or at parts attached thereon by threaded nuts 28.

According to FIG. 3, the first bearing support 16 is connected with a bearer 29 extending in the vehicle longitudinal direction C—C on the side opposite the transmission 14. The bearer 29 includes legs 30 and 31 extending in the direction of the road surface so that it surrounds the transmission 14 yoke-like. Cross bearers 32 and 33 are connected with the free ends of the legs 30 and 31 which are directed in the vehicle transverse direction E—E. The bearers 29 and the cross bearers 32 and 33 are components of an auxiliary frame or bogie generally designated by reference numeral 34 which is retained at the body 2 of the passenger motor vehicle 1 by means of bolts possibly under interposition of elastic elements.

The second bearing support 17 is connected with a bracket 35 attached at the body 2 on the side opposite the crankcase 9. The bracket 35 includes an arm 36 that extends in the vehicle transverse direction E—E.

The bearing supports 16 and 17 can be preassembled at the bearer 29, respectively, arm 36 whereby in this case the internal combustion engine 5 is brought to these bearing supports at which it s suspended from the bottom side of the passenger motor vehicle.

The lower torque support 18 is arranged at the transmission 14 below a cross plane 37 (FIG. 1) intersecting the crankshaft longitudinal axis D of the internal combustion engine 5. The distance between the cross plane 37 and the bearing plane 38 of the torque support 18 is designated by reference character J. On the side opposite the transmission 14, it can be arranged at the end wall 22 or at the cross bearer 33 of the auxiliary frame 34.

The upper torque support 19 extends above the cylinder row 7 and is connected with an angle lever 39 (FIG. 2) that is secured at the crankcase 10, and more particularly between the cylinder rows 6 and 7. On the side remote from the angle lever 39, it is retained at the end wall 22. Finally, the two torque supports 18 and 19 are so arranged that they are supported at the internal combustion engine 5 in proximity of the vertical Plane 20' through the center of gravity of the internal combustion engine.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A mounting for an internal combustion engine with a transmission secured at one end of the engine, comprising bearing support means and torque support means for retaining the transmission and internal combustion engine at relatively fixed parts, said bearing support means including a first bearing support means and a second bearing support means, the weight of the transmission and the internal combustion engine being hangingly suspended solely by the first and second bearing support means, the first bearing support means is arranged above but not far from a horizontal plane that passes horizontally through the center of gravity of the engine as well as adjacent a vertical plane that passes vertically through the center of gravity of the internal combustion engine, the second bearing support means is attached to the internal combustion engine adjacent a side thereof that is opposite to the end with the transmission, and wherein the torque support means counteracts torque forces from the transmission and internal combustion and includes at least two horizontally directed torque support means that are provided offset to one another in height and wherein at least one of said two torque support means extends between fixed parts and the internal combustion engine.

2. A mounting of an internal combustion engine according to claim 1, in which the engine includes V-shaped cylinder rows, forms a unit with the transmission and is installed transversely into a body of a passenger motor vehicle.

3. A mounting of an internal combustion engine according to claim 1, wherein the relatively fixed parts are fixed body parts.

4. A mounting of an internal combustion engine according to claim 1, wherein the second bearing support means is attached in proximity of an end wall of the internal combustion engine.

5. A mounting according to claim 1, wherein the engine includes V-shaped cylinder rows, first bearing support means cooperates with the transmission while the second bearing support means is arranged at a mounting area of the internal combustion engine intermediate the V-shaped cylinder rows.

6. A mounting according to claim 5, wherein said mounting area is part of the crankcase.

7. A mounting according to claim 5, wherein the two bearing support means are located in proximity of a center longitudinal plane of the internal combustion engine.

8. A mounting according to claim 1, wherein the first bearing support means is stiffer in the vehicle longitudinal direction than in the vehicle transverse direction while the second bearing support means is stiffer in the vehicle transverse direction than in the vehicle longitudinal direction.

9. A mounting according to claim 8, wherein the two bearing support means are constructively identical parts with substantially identical rubber geometry.

10. A mounting according to claim 5, wherein each bearing support means includes a metallic flange that is connected directly with the transmission, respectively, the mounting area.

11. A mounting according to claim 10, wherein the first bearing support is connected at a side, opposite the connection with the transmission, with a bearing means extending in the vehicle longitudinal direction.

12. A mounting according to claim 11, wherein the bearer means surrounds the transmission yoke-like and is connected at cross bearer means extending below the bearing support means.

13. A mounting according to claim 12, wherein the first-mentioned bearer means and the cross bearer means are components of an auxiliary frame.

14. A mounting according to claim 5, wherein the second bearing support means is operatively connected at a side opposite the connection to the mounting area, with a bracket means secured at the body.

15. A mounting according to claim 14, wherein the second bearing support means is connected to an approximately horizontally directed arm of the bracket means.

16. A mounting according to claim 15, wherein the transmission and the internal combustion engine are connected to the bearing support means at a bottom side thereof.

17. A mounting according to claim 1, wherein the lower torque support means is secured at the transmission underneath the longitudinal center axis of the crankshaft of the engine.

18. A mounting according to claim 17, wherein the first-mentioned bearer means and the cross bearer means are components of an auxiliary frame.

19. A mounting according to claim 18, wherein the lower torque support means is attached at a side thereof, opposite the securement to the transmission, at the cross bearer means of the auxiliary frame.

20. A mounting according to claim 2, wherein the upper torque support means extends above a cylinder row and is connectedly retained at a mounting area between the cylinder rows by means of a lever means.

21. A mounting according to claim 20, wherein the upper torque support means is secured at a side thereof, remote from the retained connection at the lever means, at an end wall of the vehicle.

22. A mounting according to claim 21, wherein the lever means is an angle lever.

23. A mounting according to claim 1, wherein the two torque support means are arranged adjacent the vertical plane through the center of gravity of the internal combustion engine.

* * * * *